United States Patent
Chien

(10) Patent No.: US 9,896,531 B2
(45) Date of Patent: Feb. 20, 2018

(54) FORMULATION FOR SILICONE HYDROGEL, SILICONE HYDROGEL AND METHOD FOR FORMING SILICONE HYDROGEL

(71) Applicant: HON HAI PRECISION INDUSTRY CO., LTD., New Taipei (TW)

(72) Inventor: Hsiu-Wen Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/240,313

(22) Filed: Aug. 18, 2016

(65) Prior Publication Data

US 2017/0362364 A1 Dec. 21, 2017

(30) Foreign Application Priority Data

Jun. 15, 2016 (TW) .............................. 105118666 A

(51) Int. Cl.
  *C08L 43/04* (2006.01)
  *C08F 226/10* (2006.01)
  *C08J 3/075* (2006.01)
  *G02B 1/04* (2006.01)

(52) U.S. Cl.
  CPC ............. *C08F 226/10* (2013.01); *C08J 3/075* (2013.01); *G02B 1/043* (2013.01); *C08J 2339/06* (2013.01)

(58) Field of Classification Search
  CPC .............................. C08L 43/04; C08G 77/20
  See application file for complete search history.

(56) References Cited

U.S. PATENT DOCUMENTS 6,020,445 A * 2/2000 Vanderlaan ........... C08F 230/08
526/212

* cited by examiner

*Primary Examiner* — Kuo-Liang Peng
(74) *Attorney, Agent, or Firm* — ScienBiziP, P.C.

(57) ABSTRACT

A formulation for silicone hydrogel for use in contact lens includes at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator. A silicone hydrogel, and a method to form silicone hydrogel are provided.

13 Claims, No Drawings

FORMULATION FOR SILICONE HYDROGEL, SILICONE HYDROGEL AND METHOD FOR FORMING SILICONE HYDROGEL

This application claims the benefit of priority under 35 USC 119 from Taiwan Patent Application 105118666, filed on Jun. 15, 2016.

FIELD

The present disclosure relates to a formulation for silicone hydrogel, a silicone hydrogel, and a method for forming a silicone hydrogel.

BACKGROUND

Contact lenses are popular. A silicone hydrogel for contact lens with high water content and good hydrophilic properties are desirable.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A formulation for silicone hydrogel includes at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator.

A method of forming a silicone hydrogel includes providing and mixing at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator, to form a mixture; and crosslinking and curing the mixture by a UV-light curing process or a heating process, to form a silicone hydrogel.

A silicone hydrogel is a reaction product of at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator.

A formulation for silicone hydrogel according to a first embodiment includes at least one silicone monomer having a weight percent of the total hydrogel weight in a range from about 10% to about 35%, at least one hydrophilic monomer having a weight percent of the total hydrogel weight in a range from about 15% to about 40%, at least one crosslinker having a weight percent of the total hydrogel weight in a range from about 0.3% to about 1%, at least one initiator having a weight percent of the total hydrogel weight in a range from about 0.4% to about 0.7%, at least one solvent having a weight percent of the total hydrogel weight in a range from about 20% to about 50%, and at least one additive having a weight percent of the total hydrogel weight in a range from about 1% to about 5%.

The silicone monomer includes, but is not limited to, silicone-containing (—Si—O—Si—) monomer, macromere, or a mixture thereof. Preferably, the silicone monomer includes or Polydimethylsiloxane (PDMS)-methacrylate.

The hydrophilic monomer includes, but is not limited to, acrylic-based monomer (CR'H=CRCOX), wherein R is H or $CH_3$, R' is H, $CH_3$ or alkali, X is O, N, or one of a hydrophilic group. Preferably, the silicone monomer includes 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a mixture thereof.

The crosslinker includes ethylene glycol dimethacrylate (EGDMA), trimethylolpropane trimethacrylate (TMPTMA), N,N'-Methylenebisacrylamide (MBAA), or a mixture thereof.

The initiator is photo-initiator or heat-initiator. Preferably, the initiator can be Azo-iso-butyronitrile (AIBN) or Irgacure-1173 (11173 is a standard number in chemical industry).

The solvent includes at least one functional group of R—OH. Preferably, the solvent can be ethanol or hexanol.

The additive includes alkyl alkoxysilanes

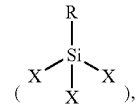

wherein X can represent alkoxy group. Preferably, the additive can be 3-(trimethoxysilyl)propyl methacrylate, hexyltrimethoxysilane, or a mixture thereof.

A method for manufacturing the silicone hydrogel according to a second embodiment includes the following steps.

A step includes providing and mixing at least one silicone monomer having a weight percent of the total hydrogel weight in a range from about 10% to about 35%, at least one hydrophilic monomer having a weight percent of the total hydrogel weight in a range from about 15% to about 40%, at least one crosslinker having a weight percent of the total hydrogel weight in a range from about 0.3% to about 1%, at least one initiator having a weight percent of the total hydrogel weight in a range from about 0.4% to about 0.7%, at least one solvent having a weight percent of the total hydrogel weight in a range from about 20% to about 50%, and at least one additive having a weight percent of the total hydrogel weight in a range from about 1% to about 5%, to form a mixture.

The silicone monomer includes, but is not limited to, silicone-containing (—Si—O—Si—) monomer, macromere, or a mixture thereof. Preferably, the silicone monomer includes Tris(hydroxymethyl)aminomethane (Tris) or Polydimethylsiloxane (PDMS).

The hydrophilic monomer includes, but is not limited to, acrylic-based monomer (CR'H=CRCOX), wherein R is H or $CH_3$, R' is H, $CH_3$ or alkly, X is O, N or one of a hydrophilic group. Preferably, the silicone monomer includes 2-hydroxyethyl methacrylate (HEMA), N-, N-dimethylacrylamide acrylamide (DMA), methacrylic acid (MAA), N-Vinylpyrrolidone (NVP), polyethylene glycol methacrylate (PEGMA), sulfobetaine methacrylate (SBMA), or a mixture thereof.

The crosslinker includes ethylene glycol dimethacrylate (EGDMA), trimethylolpropane trimethacrylate (TMPTMA), N,N'-Methylenebisacrylamide (MBAA), or a mixture thereof.

The initiator is photo-initiator or heat-initiator. Preferably, the initiator can be Azo-iso-butyronitrile (AIBN) or Irgacure-1173 (11173 is a standard number in chemical industry).

The solvent includes at least one functional group of R—OH. Preferably, the solvent can be ethanol or hexanol.

The addition includes alkyl silanes

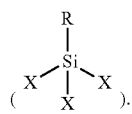

Preferably, the additive can be 3-aminoisopropyltriethoxysilanes, hexyltrimethoxysilane, or a mixture thereof.

A step includes cross-linking and curing the mixture by a UV-light curing process or a heating process, to form a silicone hydrogel.

A step includes swelling the silicone hydrogel by immersion into ethanol solution with a volume percent of about 50% and subsequently into deionized water.

A silicone hydrogel for contact lens according to a third embodiment is a reaction product of the formulation for silicone hydrogel.

EXAMPLES

The following examples illustrate methods for manufacturing the silicone hydrogel, which should be understood not to be limiting.

Example 1

HEMA having a weight percent of the total hydrogel weight of 9.9%, NVP having a weight percent of the total hydrogel weight of 23%, Tris having a weight percent of the total hydrogel weight of 30%, EGDMA having a weight percent of the total hydrogel weight of 0.66%, 11173 having a weight percent of the total hydrogel weight of 0.66%, 3-(trimethoxysilyl)propyl methacrylate having a weight percent of the total hydrogel weight of 2.6% and hexanol having a weight percent of the total hydrogel weight of 33% were mixed to form a mixture. The mixture was poured in a mold and then was reacted under UV lamp for 10 minutes to form a silicone hydrogel sheet. Then the silicone hydrogel sheet is made to swell by immersing into ethanol solution with a volume percent of about 50% and subsequently into deionized water, to form a silicone hydrogel for contact lens.

A transparency of the silicone hydrogel is about 97%. A water content of the silicone hydrogel is 58%. A surface water contact angle of the silicone hydrogel is 33 degrees. A tensile strain of the silicone hydrogel is within a range about 235%. A DK (oxygen permeability) of the silicone hydrogel is within a range about 58.

Example 2

HEMA having a weight percent of the total hydrogel weight of 26%, DMA having a weight percent of the total hydrogel weight of 6.78%, Tris having a weight percent of the total hydrogel weight of 30.3%, EGDMA having a weight percent of the total hydrogel weight of 0.66%, 11173 having a weight percent of the total hydrogel weight of 0.66%, 3-(trimethoxysilyl)propyl methacrylate having a weight percent of the total hydrogel weight of 2.6% and hexanol having a weight percent of the total hydrogel weight of 33% were mixed to form a mixture. The mixture was poured in a mold and then was reacted under UV lamp for 25 min to form a silicone hydrogel sheet. Then the silicone hydrogel sheet is made to swell by immersing into ethanol solution with a volume percent of about 50% and subsequently into deionized water, to form a silicone hydrogel for contact lens.

A transparency of the silicone hydrogel is about 98%. A water content of the silicone hydrogel is 48%. A surface water contact angle of the silicone hydrogel is 42 degrees. A tensile strain of the silicone hydrogel is within a range of 189%. A DK of the silicone hydrogel is within a range of 55.

Example 3

HEMA having a weight percent of the total hydrogel weight of 11.2%, DMA having a weight percent of the total hydrogel weight of 29%, Tris having a weight percent of the total hydrogel weight of 30.78%, EGDMA having a weight percent of the total hydrogel weight of 0.56%, 11173 having a weight percent of the total hydrogel weight of 0.46%, hexyltrimethoxysilane having a weight percent of the total hydrogel weight of 1% and hexanol having a weight percent of the total hydrogel weight of 27% were mixed to form a mixture. The mixture was poured in a mold and then was reacted under UV lamp for 30 min to form a silicone hydrogel sheet. Then the silicone hydrogel sheet is made to swell by immersing into ethanol solution with a volume percent of about 50% and subsequently into deionized water, to form a silicone hydrogel for contact lens.

A transparency of the silicone hydrogel is about 98%. A water content of the silicone hydrogel is 60.5%. A surface water contact angle of the silicone hydrogel is 14 degrees. A tensile strain of the silicone hydrogel is within a range of 405%. A DK of the silicone hydrogel is within a range of 100.

Example 4

DMA having a weight percent of the total hydrogel weight of 40%, PDMS-ethacrylates having a weight percent of the total hydrogel weight of 13.4%, TMPTMA having a weight percent of the total hydrogel weight of 0.56%, AIBN having a weight percent of the total hydrogel weight of 0.53%, hexyltrimethoxysilane having a weight percent of the total hydrogel weight of 5% and hexanol having a weight percent of the total hydrogel weight of 40.51% were mixed to form a mixture. The mixture was poured in a mold and then was heated at 65 degrees Celsius for 2 hours to form a silicone hydrogel sheet. Then the silicone hydrogel sheet is made to swell by immersing into ethanol solution with a volume percent of about 50% and subsequently into deionized water, to form a silicone hydrogel for contact lens.

A transparency of the silicone hydrogel is about 96%. A water content of the silicone hydrogel is 46%. A surface water contact angle of the silicone hydrogel is 44 degrees. A tensile strain of the silicone hydrogel is within a range of 210%. A DK of the silicone hydrogel is within a range of 120.

Example 5

HEMA having a weight percent of the total hydrogel weight of 2%, SBMA having a weight percent of the total hydrogel weight of 2%, DMA having a weight percent of the total hydrogel weight of 12%, Tris having a weight percent of the total hydrogel weight of 13.4%, TMPTMA having a weight percent of the total hydrogel weight of 0.16%, AIBN having a weight percent of the total hydrogel weight of 0.53%, n-octadecyl trimethoxysilane having a weight percent of the total hydrogel weight of 4% and hexanol having a weight percent of the total hydrogel weight of 40.51% were mixed to form a mixture. The mixture was poured in a mold and then was heated at 65 degrees Celsius for 2 hours to form a silicone hydrogel sheet. Then the silicone hydrogel sheet is made to swell by immersing into ethanol solution with a volume percent of about 50% and subsequently into deionized water, to form a silicone hydrogel for contact lens.

A transparency of the silicone hydrogel is about 96%. A water content of the silicone hydrogel is 46%. A surface water contact angle of the silicone hydrogel is 52 degrees. A tensile strain of the silicone hydrogel is within a range of 340%. A DK of the silicone hydrogel is within a range of 150.

In examples 1 to 5, the transparency was measured by UV-visible spectrometry, the surface water contact angle was measured by a drop shape method, and the water content was calculated by a following formulation:

Water content (%)=$100*(W_{wet}-W_{dry})/W_{dry}$;

wherein $W_{wet}$ is a weight of the silicone hydrogel, and $W_{dry}$ is a weight of the silicone hydrogel without water. The tensile strain was measured by a tensile strength testing machine, the DK was measured by a polarographic measurement.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A formulation for silicone hydrogel, comprising:
at least one silicone monomer having a weight percent of the total hydrogel weight in a range from about 10% to about 35%;
at least one hydrophilic monomer having a weight percent of the total hydrogel weight in a range from about 15% to about 40%;
at least one crosslinker;
at least one initiator;
at least one solvent having a weight percent of the total hydrogel weight in a range from about 20% to about 50%; and
at least one additive having a weight percent of the total hydrogel weight in a range from about 1% to about 5%, the additive comprising alkyl alkoxysilanes.

2. A method of forming a silicone hydrogel, comprising:
providing and mixing at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator, and at least one additive having a weight percent of the total hydrogel weight in a range from about 1% to about 5%, to form a mixture, the additive comprising alkyl alkoxysilanes; and
cross-linking and curing the mixture by a UV-light curing process or a heating process, to form the silicone hydrogel.

3. The method of claim 2, wherein the hydrophilic monomer comprises 2-hydroxyethyl methacrylate, N-dimethylacrylamide acrylamide, methacrylic acid, polyethylene glycol methacrylate, sulfobetaine methacrylate, or a mixture thereof.

4. The method of claim 2, wherein the crosslinker comprises ethylene glycol dimethacrylate, trimethylolpropane trimethacrylate, N,N'-Methylenebisacrylamide, or a mixture thereof, a weight percent of the total hydrogel weight of the crosslinker is in a range from about 0.3% to about 1%.

5. The method of claim 2, wherein the initiator is photo-initiator or heat-initiator, a weight percent of the total hydrogel weight of the initiator is in a range from about 0.4% to about 0.7%.

6. The method of claim 2, wherein the mixture further comprises at least one solvent having a weight percent of the total hydrogel weight in a range from about 20% to about 50%.

7. A silicone hydrogel, which is a reaction product of at least one silicone monomer having a weight percent of the total hydrogel weight in a range from about 10% to about 35%, at least one hydrophilic monomer having a weight percent of the total hydrogel weight in a range from about 15% to about 40%, at least one crosslinker, and at least one initiator; and at least one additive having a weight percent of the total hydrogel weight in a range from about 1% to about 5%, the additive comprising alkyl alkoxysilanes.

8. The silicone hydrogel of claim 7, wherein the silicone monomer comprises silicone-containing monomer, macromer, or a mixture thereof.

9. The silicone hydrogel of claim 7, wherein the hydrophilic monomer comprises 2-hydroxyethyl methacrylate, N-dimethylacrylamide acrylamide, methacrylic acid, polyethylene glycol methacrylate, sulfobetaine methacrylate, or a mixture thereof.

10. The silicone hydrogel of claim 7, wherein the crosslinker comprises ethylene glycol dimethacrylate, trimethylolpropane trimethacrylate, N,N'-Methylenebisacrylamide, or a mixture thereof.

11. The silicone hydrogel of claim 7, wherein a weight percent of the total hydrogel weight of the crosslinker is in a range from about 0.3% to about 1%.

12. The silicone hydrogel of claim 7, wherein the initiator is photo-initiator or heat-initiator, a weight percent of the total hydrogel weight of the initiator is in a range from about 0.4% to about 0.7%.

13. The silicone hydrogel of claim 7, further comprising at least one solvent having a weight percent of the total hydrogel weight in a range from about 20% to about 50%.

* * * * *